United States Patent
Endo et al.

(10) Patent No.: US 10,322,714 B2
(45) Date of Patent: Jun. 18, 2019

(54) HYBRID VEHICLE AND CONTROL METHOD FOR SAME

(71) Applicant: TOYOTA JIDOSHA KABUSHIKI KAISHA, Toyota-shi, Aichi-ken (JP)

(72) Inventors: Hiroki Endo, Nissin (JP); Koji Hokoi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 128 days.

(21) Appl. No.: 15/312,773

(22) PCT Filed: Apr. 30, 2015

(86) PCT No.: PCT/IB2015/000595
§ 371 (c)(1),
(2) Date: Nov. 21, 2016

(87) PCT Pub. No.: WO2015/181595
PCT Pub. Date: Dec. 3, 2015

(65) Prior Publication Data
US 2017/0113677 A1    Apr. 27, 2017

(30) Foreign Application Priority Data
May 28, 2014 (JP) .................. 2014-110115

(51) Int. Cl.
*B60L 9/00* (2019.01)
*B60L 11/00* (2006.01)
(Continued)

(52) U.S. Cl.
CPC ............. *B60W 20/40* (2013.01); *B60K 6/445* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS 9,744,963 B2 *  8/2017  Kinomura ............. B60W 20/13
2013/0297129 A1  11/2013  Ang et al.
(Continued)

FOREIGN PATENT DOCUMENTS

JP    2009-210045    9/2009
JP    2009-214828    9/2009
(Continued)

*Primary Examiner* — Abby Y Lin
*Assistant Examiner* — Kenny A. Taveras
(74) *Attorney, Agent, or Firm* — Finnegan, Henderson, Farabow, Garrett & Dunner, LLP

(57) ABSTRACT

A vehicle is provided with an engine, a battery, a second motor generator generating a driving force by using electric power of the battery, and an electronic control unit (ECU) controlling the engine and the second motor generator. The ECU is configured to be capable of executing rotation speed increase control for controlling the rotation speed of the engine so that the sound pressure of the engine is increased in response to an increase in the vehicle speed of the vehicle. In a charge depleting (CD) mode in which the state of charge (SOC) of the battery is consumed, the ECU limits the execution of the rotation speed increase control compared to a charge sustaining (CS) mode in which the SOC is maintained in a predetermined range.

8 Claims, 8 Drawing Sheets

(51) Int. Cl.
    *G05D 1/00*     (2006.01)
    *G05D 3/00*     (2006.01)
    *G06F 7/00*     (2006.01)
    *G06F 17/00*     (2019.01)
    *B60W 20/40*     (2016.01)
    *B60K 6/445*     (2007.10)
    *B60W 10/06*     (2006.01)
    *B60W 10/08*     (2006.01)
    *B60W 20/15*     (2016.01)
    *B60W 10/30*     (2006.01)
    *B60K 6/46*     (2007.10)

(52) U.S. Cl.
    CPC ............ *B60W 10/30* (2013.01); *B60W 20/15* (2016.01); *B60K 6/46* (2013.01); *B60W 2710/0644* (2013.01); *B60Y 2200/92* (2013.01); *B60Y 2300/194* (2013.01); *B60Y 2300/91* (2013.01); *Y02T 10/6239* (2013.01); *Y02T 10/6269* (2013.01); *Y02T 10/6286* (2013.01); *Y10S 903/905* (2013.01)

(56) References Cited

U.S. PATENT DOCUMENTS

2013/0317682 A1     11/2013    Morisaki
2015/0191164 A1      7/2015    Kinomura

FOREIGN PATENT DOCUMENTS

| | | |
|---|---|---|
| JP | 2012-144138 | 8/2012 |
| JP | 5382238 B2 | 1/2014 |
| WO | WO 2012/101735 A1 | 8/2012 |
| WO | WO 2012/105021 A1 | 8/2012 |
| WO | WO2014/033915 A1 | 3/2014 |

\* cited by examiner

HYBRID VEHICLE AND CONTROL METHOD FOR SAME

CROSS-REFERENCE TO RELATED APPLICATIONS

This application is a national phase application of International Application No. PCT/IB2015/000595, filed Apr. 30, 2015, and claims the priority of Japanese Application No. 2014-110115, filed May 28, 2014, the content of both of which is incorporated herein by reference.

BACKGROUND OF THE INVENTION

1. Field of the Invention

The invention relates to a hybrid vehicle and a control method for the same and, more particularly, a hybrid vehicle that is configured to be capable of executing rotation speed increase control for controlling the rotation speed of an internal combustion engine so that the sound pressure of the internal combustion engine is increased in response to an increase in the vehicle speed, and a control method for the same.

2. Description of Related Art

Engine sound pressure is known as a factor that gives a driver a sense of acceleration during the acceleration of a vehicle. If, engine sound pressure corresponding to an increment in the vehicle speed is not generated, the driver may not feel the vehicle is sufficiently accelerated. Accordingly, techniques for giving a driver a sense of acceleration corresponding to an increment in the vehicle speed by controlling an engine rotation speed so that engine sound pressure is increased in response to an increase in the vehicle speed have been proposed.

For example, in a vehicle traveling control device that is disclosed in Japanese Patent Application Publication No. 2009-210045 (JP 2009-210045 A), an internal combustion engine and a continuously variable transmission are controlled so as to realize a target rotation speed, which is a target value of the rotation speed of the internal combustion engine, in a vehicle on which the continuously variable transmission is mounted. In a case where the vehicle is in an accelerating state, the target rotation speed is set so that an increment in the sound pressure of the internal combustion engine is proportional to an increment in the vehicle speed.

The control of the engine rotation speed for increasing the engine sound pressure in response to an increase in the vehicle speed as described above will be referred to as rotation speed increase control in this specification. Application of the rotation speed increase control to a hybrid vehicle has been examined so as to realize a sense of acceleration in the hybrid vehicle.

The rotation speed increase control will be described in detail later. It is desirable to set a target operating point for an engine to be positioned on an optimal fuel efficiency line regardless of whether or not the rotation speed increase control is executed. In a case where the rotation speed increase control is executed, a target operating point with a low engine rotation speed is set on the optimal fuel efficiency line compared to a case where the rotation speed increase control is not executed. Power (engine output power) that is output from the engine when the engine is driven so as to realize the target operating point is less than engine output power for a case where the rotation speed increase control is not executed. Accordingly, the engine output power may fall short of a power demand for the vehicle (vehicle power demand). In the hybrid vehicle, the power shortfall is supplemented by power output from a motor (motor output power).

Some hybrid vehicles have a charge depleting (CD) mode in which the state of charge (SOC) of the electric power storage device is consumed and a charge sustaining (CS) mode in which the SOC is maintained in a predetermined range as traveling modes. In the CD mode, EV traveling (traveling in a state where the engine is stopped) is mainly performed, and the engine is started in a case where the vehicle power demand cannot be satisfied by the motor output power. In other words, discharging electric power from the electric power storage device (battery) during the start of the engine in the CD mode has a value close to a discharging electric power upper limit value in many cases. Accordingly, if a target operating point with a lower engine rotation speed is set so as to execute the rotation speed increase control, electric power for supplementing the shortfall is unlikely to be supplied from the battery to the motor in a case where the engine output power falls short of the vehicle power demand. As a result, a situation may occur in which it is impossible to satisfy the vehicle power demand.

SUMMARY OF THE INVENTION

The invention has been made in view of the problems described above, and an object thereof is to provide a hybrid vehicle with which the probability of being capable of ensuring the output power required for satisfying a vehicle power demand can be increased in the hybrid vehicle having a charge depleting mode and a charge sustaining mode and configured to be capable of executing rotation speed increase control, and a control method for the same.

According to a first aspect of the invention, there is provided a hybrid vehicle including an internal combustion engine, an electric power storage device, a rotary electric machine, and an electronic control unit. The rotary electric machine is configured to generate a driving force by using electric power of the electric power storage device. The electronic control unit is configured to control the internal combustion engine and the rotary electric machine. The electronic control unit is configured to execute rotation speed increase control for controlling a rotation speed of the internal combustion engine so as to increase a sound pressure of the internal combustion engine in response to an increase in a vehicle speed of the hybrid vehicle. In addition, the electronic control unit is configured to limit the execution of the rotation speed increase control in a charge depleting mode compared to a charge sustaining mode. In the charge depleting mode, a state of charge of the electric power storage device is consumed, and in the charge sustaining mode the state of charge of the electric power storage device is maintained in a predetermined range.

According to a second aspect of the invention, there is provided a control method for a hybrid vehicle. The hybrid vehicle includes an internal combustion engine, an electric power storage device, and a rotary electric machine generating a driving force by using electric power of the electric power storage device. In the control method, a rotation speed of the internal combustion engine is controlled so as to increase a sound pressure of the internal combustion engine in response to an increase in a vehicle speed of the hybrid vehicle, that is rotation speed increase control is executed. In the control method, the execution of the rotation speed increase control is limited in a charge depleting mode compared to a charge sustaining mode. In the charge depleting mode, a state of charge of the electric power storage device is consumed. In the charge sustaining mode, the state of charge of the electric power storage device is maintained in a predetermined range.

According to the hybrid vehicle having the configuration described above and the control method for the hybrid vehicle, the execution of the rotation speed increase control is limited in the charge depleting mode compared to the charge sustaining mode. Accordingly, a reduction in the rotation speed of the internal combustion engine is limited in the charge depleting mode, and thus a situation is unlikely to occur in which a shortfall of output power from the internal combustion engine is supplemented by using discharging electric power from the electric power storage device. Accordingly, the probability of being capable of ensuring the output power required for satisfying a vehicle power demand in the charge depleting mode (sum of the output power from the internal combustion engine and output power from the rotary electric machine) can be increased.

In the hybrid vehicle, the electronic control unit may be configured to (i) allow the execution of the rotation speed increase control in the charge sustaining mode, and (ii) prohibit the execution of the rotation speed increase control in the charge depleting mode.

According to the hybrid vehicle having the configuration described above, the execution of the rotation speed increase control is prohibited in the charge depleting mode, and thus a reduction in the rotation speed of the internal combustion engine is prevented. In this manner, a situation in which the output power from the internal combustion engine falls short is even less likely to occur. Accordingly, ensuring of the output power required for satisfying the vehicle power demand can be realized with the maximum reliability possible. In the charge sustaining mode, the execution of the rotation speed increase control is allowed. Accordingly, a driver can be given a sense of acceleration corresponding to an increment in the vehicle speed, and thus drivability can be improved.

In the hybrid vehicle, the electronic control unit may be configured to limit the prohibition of the execution of the rotation speed increase control in the charge depleting mode to a range in which the internal combustion engine and the sound pressure have a specific relationship.

According to the hybrid vehicle having the configuration described above, the execution of the rotation speed increase control is prohibited only in a range in which the internal combustion engine and the sound pressure have a specific relationship in the charge depleting mode, and thus an unnecessary reduction in the rotation speed of the internal combustion engine can be prevented. Accordingly, a situation in which the output power from the internal combustion engine falls short is even less likely to occur.

In the hybrid vehicle, the electronic control unit may be configured to prohibit the rotation speed increase control regardless of the charge sustaining mode or the charge depleting mode in a case where an upper limit value of discharging electric power of the electric power storage device is less than a predetermined value.

According to the hybrid vehicle having the configuration described above, the rotation speed increase control is prohibited regardless of the charge sustaining mode or the charge depleting mode in a case where the upper limit value of the discharging electric power of the electric power storage device is exceeded by a predetermined value, that is, in a case where the dischargeable electric power of the electric power storage device is decreased not to reach a normal upper limit value. Accordingly, an unnecessary reduction in the rotation speed of the internal combustion engine can be prevented. Accordingly, a situation in which the output power from the internal combustion engine falls short is even less likely to occur.

In the hybrid vehicle, the electronic control unit may be configured to reduce the ratio of power output from the internal combustion engine to a power demand for the hybrid vehicle and increase the ratio of power output from the rotary electric machine to the power demand, by reducing the rotation speed in a case where the rotation speed increase control is executed compared to a case where the rotation speed increase control is not executed. The electronic control unit furthermore may be configured to suppress a reduction in the ratio of the power output from the internal combustion engine, by setting a decrement in the rotation speed to be small in the charge depleting mode compared to the charge sustaining mode, as a limitation on the execution of the rotation speed increase control.

According to the hybrid vehicle having the configuration described above, the decrement in the rotation speed of the internal combustion engine is set to be small in the charge depleting mode compared to the charge sustaining mode, and thus a reduction in the ratio of the power output from the internal combustion engine can be suppressed. In this manner, the shortfall of the output power from the internal combustion engine becomes smaller in the charge depleting mode than in the charge sustaining mode, and thus the shortfall is likely to be supplemented by using the electric power supplied from the electric power storage device. Accordingly, the probability of being capable of ensuring the output power required for satisfying the vehicle power demand can be increased. In addition, the drivability can be improved since the rotation speed increase control is executed even in the charge depleting mode although the decrement in the rotation speed of the internal combustion engine is limited.

In the hybrid vehicle, the electronic control unit may be configured to relax the limitation on the execution of the rotation speed increase control even in the charge depleting mode when the internal combustion engine is started in response to a start request for the internal combustion engine, the start request being not associated with the power demand for the hybrid vehicle. In addition, in the hybrid vehicle, the hybrid vehicle may further include an air-conditioner performing air conditioning in a passenger compartment of the hybrid vehicle. The start request may include at least one of a warm-up request for the internal combustion engine and a heating request for the air-conditioner.

According to the hybrid vehicle having the configuration described above, examples of the start request for the internal combustion engine not associated with the power demand for the hybrid vehicle include the warm-up request for the internal combustion engine and the heating request for the air-conditioner. If the start request is to be satisfied, the internal combustion engine is started even if the power demand for the vehicle does not reach a start threshold for the internal combustion engine. When the internal combustion engine is started in this manner, the discharging electric power from the electric power storage device does not have a value close to the discharging electric power upper limit value, and a margin for increasing the discharging electric power is present to some extent. Accordingly, in a case where the rotation speed of the internal combustion engine is reduced by the execution of the rotation speed increase control, the shortfall of the output power of the internal combustion engine can be supplemented by using the discharging electric power from the electric power storage device.

Accordingly, even in the charge depleting mode, the limitation on the execution of the rotation speed increase control is relaxed when the internal combustion engine is started in response to the start request for the internal combustion engine not associated with the power for the hybrid vehicle. More specifically, the prohibition of the execution of the rotation speed increase control is released (that is, the execution is allowed or the decrement in the rotation speed of the internal combustion engine is set to be greater than before the relaxation). Accordingly, even in the charge depleting mode, the drivability can be improved by using the rotation speed increase control.

According to the hybrid vehicle having the configuration described above and the control method for the hybrid vehicle, the probability of being capable of ensuring the output power required for satisfying a vehicle power demand can be increased in the hybrid vehicle having a charge depleting mode and a charge sustaining mode and configured to be capable of executing rotation speed increase control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
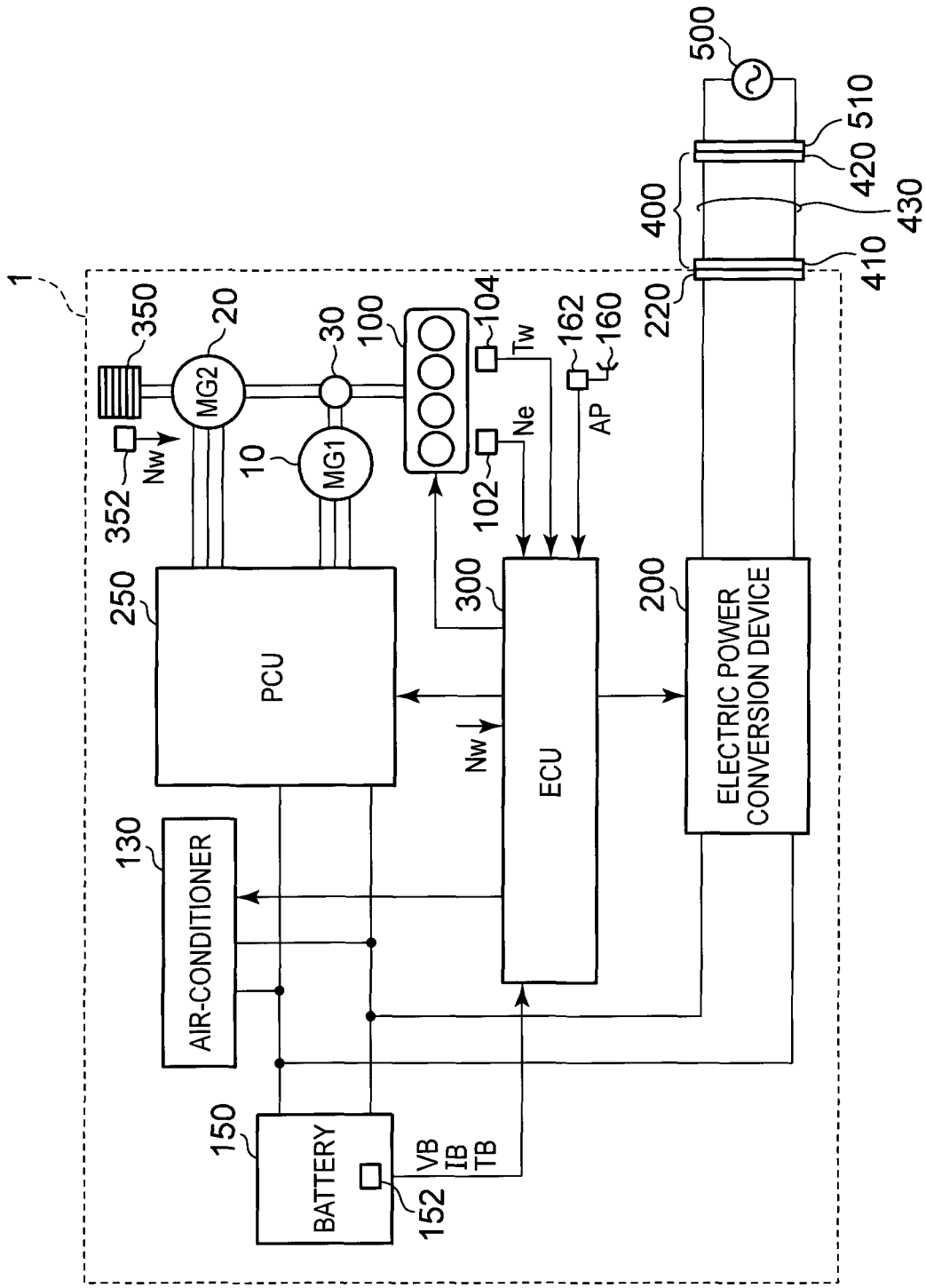
FIG. 1 is a schematic block diagram illustrating the overall configuration of a vehicle according to a first embodiment.

Hereinafter, embodiments of the invention will be described in detail with reference to the accompanying drawings. In the drawings, like reference numerals will be used to refer to like or corresponding elements and description thereof will not be repeated.

In the following description of the embodiments, a plug-in hybrid vehicle that is configured to be capable of supplying electric power from the outside of the vehicle to an electric power storage device (hereinafter, referred to as a battery) mounted on the vehicle will be described as an exemplary form of a hybrid vehicle. However, the hybrid vehicle to which the invention can be applied is not limited thereto. The invention can also be applied to hybrid vehicles in general that do not assume electric power supply from the outside of the vehicles.

A first embodiment of the invention will be described first. FIG. 1 is a schematic block diagram illustrating the overall configuration of a vehicle according to the first embodiment. Referring to FIG. 1, a vehicle 1 is provided with an engine 100, a first motor generator 10 (MG1), a second motor generator 20 (MG2), a power split mechanism 30, a power control unit (PCU) 250, a battery 150, an electronic control unit (ECU) 300, and a drive wheel 350.

The engine 100 is, for example, an internal combustion engine such as a gasoline engine and a diesel engine. A crank position sensor 102 and a liquid temperature sensor 104 are disposed in the engine 100.

The crank position sensor 102 detects the rotation speed (engine rotation speed) Ne of a crankshaft (not illustrated) of the engine 100. The liquid temperature sensor 104 detects the temperature (liquid temperature) Tw of a coolant that flows in a cooling system (not illustrated) of the engine 100. Each of the sensors outputs a signal that shows the result of the detection to the ECU 300.

Both of the first motor generator 10 and the second motor generator 20 are, for example, three-phase AC rotary electric machines in which permanent magnets are embedded in rotors (none of which is illustrated). The first motor generator 10 and the second motor generator 20 are driven by the PCU 250.

The first motor generator 10 is connected to the crankshaft of the engine 100 via the power split mechanism 30. The first motor generator 10 rotates the crankshaft of the engine 100 by using electric power of the battery 150 when the engine 100 is started. In addition, the first motor generator 10 can generate electric power by using power of the engine 100. AC electric power that is generated by the first motor generator 10 is converted into DC electric power by the PCU 250 and the battery 150 is charged therewith. In addition, the AC electric power that is generated by the first motor generator 10 is supplied to the second motor generator 20 in some cases.

The second motor generator 20 rotates a drive shaft by using at least one of the electric power from the battery 150 and the electric power that is generated by the first motor generator 10. In addition, the second motor generator 20 can generate electric power by regenerative braking. AC electric power that is generated by the second motor generator 20 is converted into DC electric power by the PCU 250 and the battery 150 is charged therewith.

The power split mechanism 30 is, for example, a planetary gear mechanism that includes a sun gear, a pinion, a carrier, and a ring gear (none of which is illustrated). The power split mechanism 30 splits the power that is generated by the engine 100 into power transmitted to the drive wheel 350 and power transmitted to the first motor generator 10.

The PCU 250 converts the DC electric power that is stored in the battery 150 into AC electric power and supplies the AC electric power to the first motor generator 10 and the second motor generator 20. In addition, the PCU 250 converts the AC electric power generated by the first motor generator 10 and the second motor generator 20 into DC electric power and supplies the DC electric power to the battery 150. The PCU 250 is controlled in accordance with a control signal from the ECU 300.

The battery 150 is a DC power supply that is configured to be chargeable and dischargeable. A secondary battery such as a lithium-ion battery, a nickel-hydrogen battery, and a lead storage battery or a capacitor such as an electric double layer capacitor can be used as the battery 150. The battery 150 supplies electric power for generating a driving force of the vehicle 1 to the PCU 250. In addition, the battery 150 stores the electric power that is generated by the first motor generator 10.

The battery 150 includes a battery sensor 152. The battery sensor 152 comprehensively represents a voltage sensor, a current sensor, and a temperature sensor (none of which is illustrated). The voltage sensor detects the voltage VB of the battery 150. The current sensor detects the I/O current IB of the battery 150. The temperature sensor detects the temperature (battery temperature) TB of the battery 150. Each of the sensors outputs a signal that shows the result of the detection to the ECU 300. The ECU 300 calculates the SOC of the battery 150 based on the voltage VB, the I/O current IB, and the battery temperature TB.

A rotation sensor 352 is disposed in a hub or a knuckle (none of which is illustrated) of the drive wheel 350. The rotation sensor 352 detects the rotation speed (drive wheel rotation speed) Nw of the drive wheel 350 and outputs a signal that shows the result of the detection to the ECU 300. The ECU 300 calculates a vehicle speed V based on the drive wheel rotation speed Nw.

A pedal stroke sensor 162 is disposed in an accelerator pedal 160. The pedal stroke sensor 162 detects a stroke amount AP of the accelerator pedal 160 and outputs a signal that shows the result of the detection to the ECU 300. The ECU 300 calculates a power demand for the vehicle 1 (vehicle power demand) based on the stroke amount AP and the vehicle speed V.

An air-conditioner 130 performs air conditioning in a passenger compartment based on the control signal from the ECU 300. This control signal is output in a case where, for example, an air conditioning request (heating request or cooling request) for the air-conditioner 130 is present by a driver's operation of an operation panel (not illustrated). In a case where the heating request is present, the air-conditioner 130 drives the engine 100 and performs heating in the passenger compartment by using heat of the engine 100.

The vehicle 1 is also provided with an electric power conversion device 200 and an inlet 220 so that electric power is supplied thereto via an electric power cable 400 from an external electric power supply 500. The external electric power supply 500 is, for example, a system electric power supply such as a commercial electric power supply. The electric power cable 400 includes a connector 410, a plug 420, and an electric wire portion 430. The plug 420 is connected to an outlet 510 of the external electric power supply 500. The electric wire portion 430 electrically connects the connector 410 and the plug 420 to each other.

The inlet 220 is disposed on, for example, an outer surface of the vehicle 1. The connector 410 of the electric power cable 400 is electrically connected to the inlet 220. The electric power conversion device 200 is electrically connected to the inlet 220 and the battery 150. The electric power conversion device 200 converts AC electric power that is supplied from the inlet 220 into DC electric power. The battery 150 is charged with the DC electric power from the electric power conversion device 200.

The electronic control unit (ECU) 300 includes a central processing unit (CPU), a memory, and a buffer (none of which is illustrated). The ECU 300 outputs the control signal based on the input of the signal from each of the sensors and a map and a program stored in the memory and controls each instrument so that the vehicle 1 is in a desired state. As an example, the ECU 300 controls each instrument so that the vehicle power demand is realized by the engine 100, the first motor generator 10, and the second motor generator 20 sharing the vehicle power demand.

Next, traveling modes will be described. The vehicle 1 has a charge depleting mode (hereinafter "charge depleting mode" is also called as "CD mode") and a charge sustaining mode (hereinafter "charge sustaining mode" is also called as "CS mode") as the traveling modes. Basically, the CD mode is a mode in which the electric power that is stored in the battery 150 is consumed. During traveling in the CD mode, engine start for maintaining the SOC is not performed. However, even in the CD mode, the engine 100 is started if the vehicle power demand exceeds a predetermined start threshold. In contrast, the CS mode is a mode in which the SOC is maintained within a predetermined range. In the CS mode, the engine 100 is started so that the SOC is maintained.

<Rotation Speed Increase Control>

Engine sound pressure is known as a factor that gives a driver a sense of acceleration during the acceleration of a vehicle. The engine sound pressure is a sound pressure (unit: dB) that is obtained by measuring the sound resulting from the driving of an engine in a passenger compartment. The engine sound pressure corresponds to the loudness of the sound the driver actually feels during driving. It is desirable to generate an engine sound pressure corresponding to a vehicle speed increment in order to improve drivability relating to the sense of acceleration.

Figure 2:
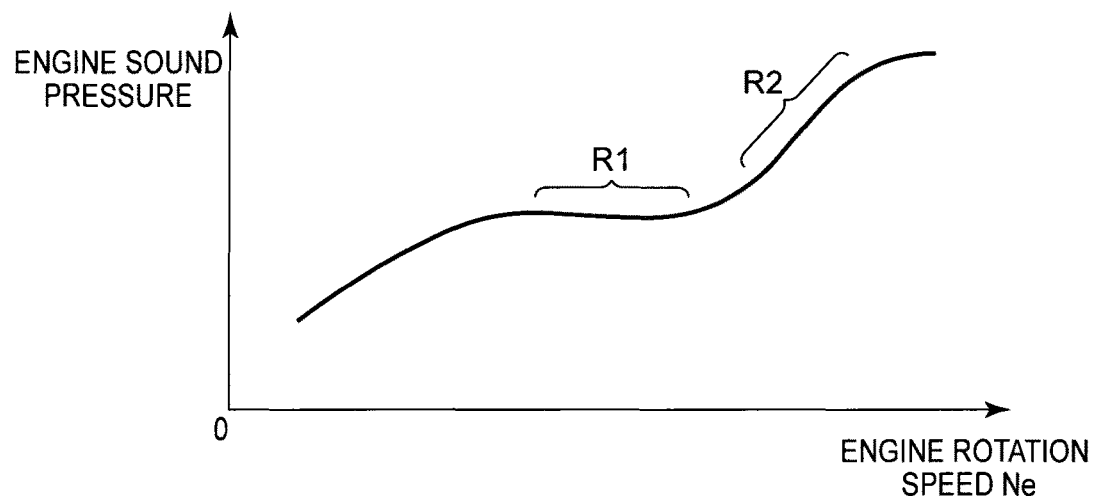
FIG. 2 is a diagram illustrating an example of the sound pressure characteristic of an engine that is illustrated in FIG. 1.

For each engine, a predetermined relationship (hereinafter, referred to as the sound pressure characteristic of the engine in some cases) is satisfied between the engine sound pressure and the engine rotation speed. FIG. 2 is a diagram illustrating an example of the sound pressure characteristic of the engine 100 that is illustrated in FIG. 1. The horizontal axis in FIG. 2 represents the engine rotation speed Ne and the vertical axis in FIG. 2 represents the engine sound pressure.

Basically, the engine 100 is controlled so that the engine rotation speed Ne is proportional to the vehicle speed V during the acceleration of the vehicle 1 referring to FIG. 2. However, as illustrated in FIG. 2, an area R1 is present in which the engine sound pressure rarely increases despite the increase in the engine rotation speed Ne and an area R2 is also present in which the engine sound pressure rapidly increases despite the little increase in the engine rotation speed Ne. Accordingly, even if the engine rotation speed Ne is proportionally increased across the board with respect to the vehicle speed V, the driver may feel an engine sound pressure corresponding to the increment in the vehicle speed V is not generated.

Accordingly, rotation speed increase control is executed in the vehicle 1 according to this embodiment. When the rotation speed increase control is executed, the increment in the engine rotation speed Ne with respect to the increase in the vehicle speed V is set to be large in the area R1 and the increment in the engine rotation speed Ne with respect to the increase in the vehicle speed V is set to be small in the area R2 compared to a case where the rotation speed increase control is not executed. Hereinafter, the rotation speed increase control will be described in more detail.

Figure 3:
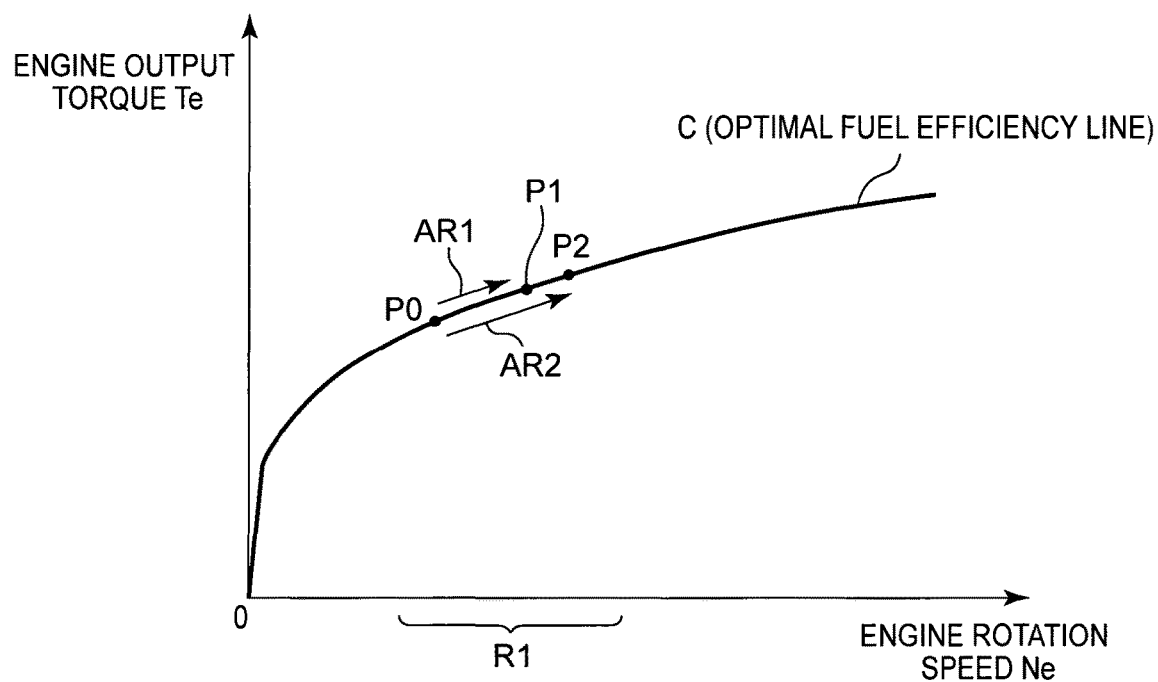
FIG. 3 is a diagram for showing the state of the engine during the execution of rotation speed increase control in an area R1 that is illustrated in FIG. 2.
Figure 4:
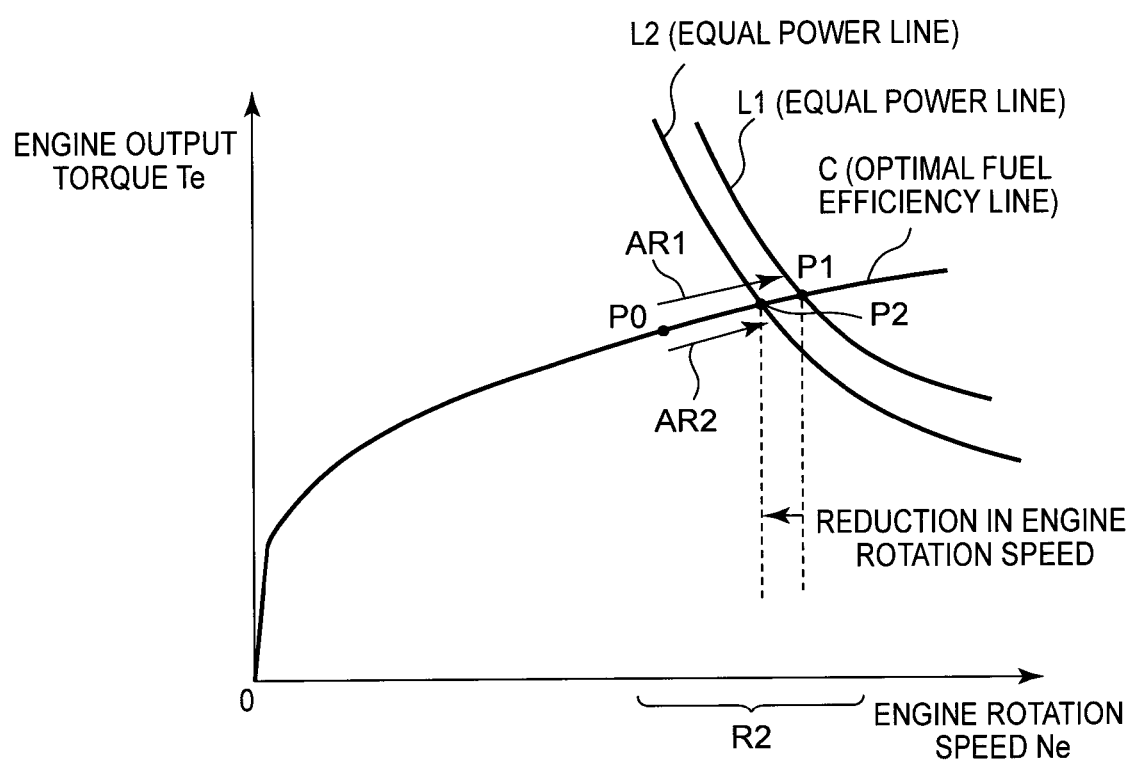
FIG. 4 is a diagram for showing the state of the engine during the execution of the rotation speed increase control in an area R2 that is illustrated in FIG. 2.

FIG. 3 is a diagram for showing the state of the engine 100 during the execution of the rotation speed increase control in the area R1 that is illustrated in FIG. 2. FIG. 4 is a diagram for showing the state of the engine 100 during the execution of the rotation speed increase control in the area R2 that is illustrated in FIG. 2. The horizontal axes in FIGS. 3 and 4 represent the engine rotation speed Ne and the vertical axes in FIGS. 3 and 4 represent a torque (engine output torque) Te output from the engine 100.

Referring to FIGS. 3 and 4, an optimal fuel efficiency line C shows a set of operating points (combination of engine rotation speed Ne and engine output torque Te) that are determined for the fuel efficiency of the engine 100 to be optimal. In order to improve fuel efficiency, it is preferable that a target operating point of the engine 100 is positioned close to the optimal fuel efficiency line C regardless of whether or not the rotation speed increase control is executed. In FIGS. 3 and 4, both a target operating point P1 for a case where the rotation speed increase control is not executed and a target operating point P2 for a case where the rotation speed increase control is executed are shown on the optimal fuel efficiency line C.

Hereinafter, a case where an operating point P0 and both of the target operating points P1, P2 are positioned in the area R1 (refer to FIG. 3) and a case where the operating point P0 and both of the target operating points P1, P2 are positioned in the area R2 (refer to FIG. 4) will be described in relation to control during the acceleration of the vehicle 1 for realizing the target operating point P1 or P2 from the operating point P0.

Referring to FIG. 3 first, the engine 100 is controlled so that the target operating point P1 is realized, as illustrated by the arrow AR1, in a case where the rotation speed increase control is not executed. As described above, in the area R1, the engine sound pressure rarely increases even if the engine rotation speed Ne is increased. Accordingly, even if the engine rotation speed Ne is increased to the target operating point P1, an engine sound pressure corresponding to the increment in the vehicle speed V cannot be generated. Accordingly, in a case where the rotation speed increase control is executed, the target operating point P2 at which the engine rotation speed Ne is higher than at the target operating point P1 is set as illustrated by the arrow AR2. In this manner, the increment in the engine rotation speed Ne increases, and thus an engine sound pressure corresponding to the increment in the vehicle speed V can be generated.

Next, referring to FIG. 4, each of equal power lines L1, L2 represents a set of operating points for outputting power having a certain constant value from the engine 100.

In a case where the rotation speed increase control is not executed, the engine 100 is controlled so that the target operating point P1 is realized as illustrated by the arrow AR1. In the area R2, the engine sound pressure rapidly increases as the engine rotation speed Ne is increased. Accordingly, if the engine rotation speed Ne is increased to the target operating point P1, the increment in the engine sound pressure excessively increases with respect to the increment in the vehicle speed V. Accordingly, in a case where the rotation speed increase control is executed, the target operating point P2 at which the engine rotation speed Ne is lower than at the target operating point P1 is set as illustrated by the arrow AR2. In other words, in a case where the rotation speed increase control is executed, the engine rotation speed Ne of the target operating point is reduced compared to a case where the rotation speed increase control is not executed. In this manner, an increase in the engine sound pressure can be suppressed.

In the area R2, power (engine output power) Pe that is output from the engine 100 may fall short of the power demand for the vehicle 1 (vehicle power demand) as the increment in the engine rotation speed Ne is set to be small. In the example that is illustrated in FIG. 4, the engine output power Pe corresponding to the difference between the power that is represented by the equal power line L1 and the power that is represented by the equal power line L2 may fall short. This shortfall is supplemented by motor output power Pm by using discharging electric power from the battery 150.

As described above, in a case where the rotation speed increase control is executed, the ratio of the engine output power Pe to the vehicle power demand is reduced compared to a case where the rotation speed increase control is not executed. Accordingly, the ratio of the motor output power Pm to the vehicle power demand needs to be raised.

In the CD mode, EV traveling is mainly performed, and the engine 100 is started in a case where the vehicle power demand cannot be satisfied by the motor output power Pm alone. In other words, the discharging electric power from the battery 150 during the start of the engine 100 in the CD mode often has a value close to a discharging electric power upper limit value Wout. Accordingly, in a case where the target operating point P2 at which the engine rotation speed Ne is lower than at the target operating point P1 is set and the engine output power Pe falls short of the vehicle power demand, it is likely that electric power for supplementing the shortfall cannot be supplied from the battery 150 to the second motor generator 20. As a result, a situation may occur in which the vehicle power demand cannot be satisfied.

The execution of the rotation speed increase control is limited in the CD mode, compared to the CS mode, according to this embodiment. More specifically, the execution of the rotation speed increase control is allowed in the CS mode whereas the execution of the rotation speed increase control is prohibited in the CD mode. In this manner, a situation is unlikely to occur in which the shortfall of the engine output power Pe is supplemented by using the output power from the battery 150 in the CD mode. Accordingly, the probability of being capable of ensuring the output power required for satisfying the vehicle power demand in the CD mode (sum of engine output power Pe and motor output power Pm) can be increased.

Figure 5:
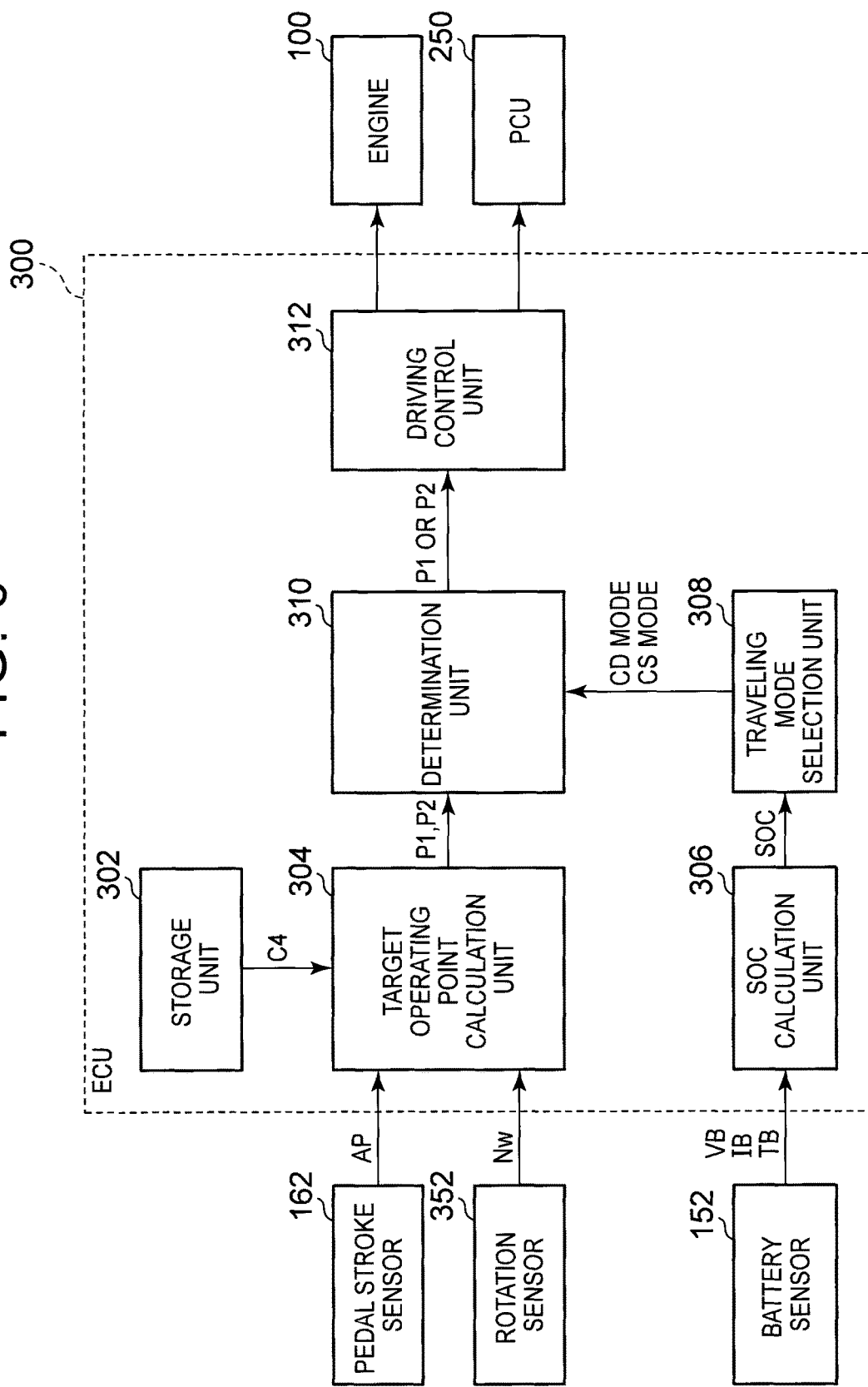
FIG. 5 is a functional block diagram for showing the functional configuration of an ECU that is illustrated in FIG. 1.

FIG. 5 is a functional block diagram for showing the functional configuration of the ECU 300 that is illustrated in FIG. 1. Referring to FIG. 5, the ECU 300 includes a storage unit 302, a target operating point calculation unit 304, an SOC calculation unit 306, a traveling mode selection unit 308, a determination unit 310, and a driving control unit 312.

The optimal fuel efficiency line C (refer to FIGS. 2 and 3) for executing the rotation speed increase control is stored in advance in the storage unit 302. Information relating to the optimal fuel efficiency line C is read by the target operating point calculation unit 304.

The target operating point calculation unit 304 calculates the target operating point P1 that is used in a case where the rotation speed increase control is not executed and the target operating point P2 that is used in a case where the rotation speed increase control is executed (refer to FIGS. 3 and 4). More specifically, the target operating point calculation unit 304 calculates an accelerator opening based on the stroke amount AP from the pedal stroke sensor 162 and calculates the vehicle speed V based on the drive wheel rotation speed Nw from the rotation sensor 352. Then, the target operating point calculation unit 304 calculates a target driving force of the vehicle 1 from the accelerator opening and the vehicle speed V in accordance with a map that shows a relationship between the accelerator opening, the vehicle speed V, and the target driving force. In addition, the target operating point calculation unit 304 calculates the target operating points P1, P2 based on the target driving force and the vehicle speed V. The values of the target operating points P1, P2 are output to the determination unit 310. Still, a method for calculating the target operating points P1, P2 is not limited thereto.

The SOC calculation unit 306 calculates the SOC of the battery 150 based on the detected values of the voltage VB, the I/O current IB, and the battery temperature TB from the battery sensor 152. The calculated SOC value is output to the traveling mode selection unit 308.

The traveling mode selection unit 308 selects one of the CS mode and the CD mode based on the SOC from the SOC calculation unit 306 and outputs the selected mode to the determination unit 310. A technique for selecting the traveling mode is not limited to what is based on the SOC. For example, with a switch (not illustrated) that accepts the driver's operation for traveling mode selection disposed in the vehicle 1, the traveling mode selection unit 308 may output a mode that is accepted by the switch.

Based on the traveling mode output from the traveling mode selection unit 308, the determination unit 310 determines whether or not to limit the execution of the rotation speed increase control and outputs the target operating point (P1 or P2) in accordance with the result of the determination to the driving control unit 312. In other words, the determination unit 310 outputs the target operating point P1 in a case where the rotation speed increase control is not executed (case where the execution of rotation speed increase control is prohibited) and outputs the target operating point P2 in a case where the rotation speed increase control is executed (refer to FIG. 4). This determination technique will be described in detail later.

The driving control unit 312 controls the engine 100 and the PCU 250 based on the target operating points P1, P2 from the determination unit 310. In other words, the driving control unit 312 controls the engine 100 and the PCU 250 so as to realize the target operating point P1 in a case where the rotation speed increase control is not executed and controls the engine 100 and the PCU 250 so as to realize the target operating point P2 in a case where the rotation speed increase control is executed.

Figure 6:
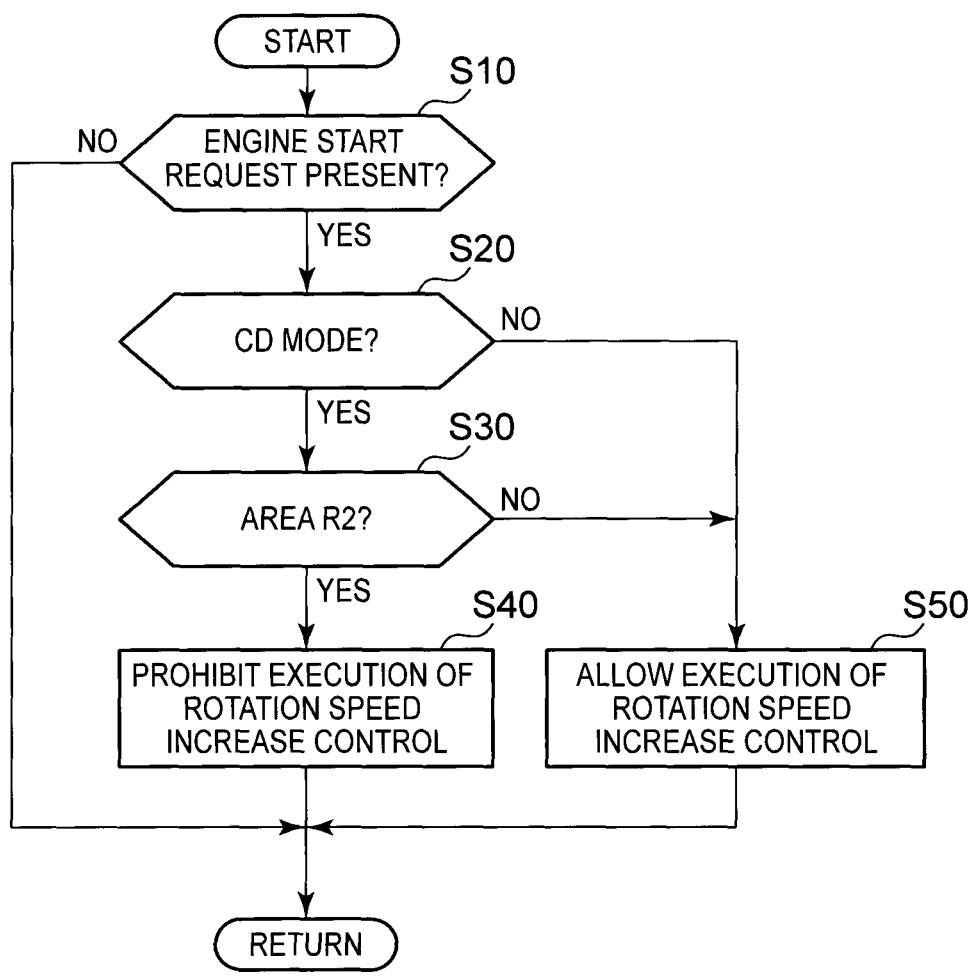
FIG. 6 is a flowchart for showing the rotation speed increase control according to the first embodiment.

FIG. 6 is a flowchart for showing the rotation speed increase control according to the first embodiment. Referring to FIG. 6, this flowchart is called from a main routine and executed when a predetermined condition is satisfied or whenever a predetermined period of time elapses. Basically, each of the Steps in this flowchart is realized by software processing by the ECU 300. Each of the Steps in this flowchart may also be realized by hardware (electronic circuit) manufactured in the ECU 300.

In Step (hereinafter, simply referred to as S) 10, the ECU 300 determines whether or not an engine start request is present (or whether or not the engine 100 is already in a driving state). More specifically, the ECU 300 determines whether or not the engine start request is present based on whether or not the vehicle power demand exceeds a predetermined start threshold. In a case where the engine start request is present or in a case where the engine 100 is in the driving state (YES in S10), the processing proceeds to S20.

In S20, the ECU 300 determines whether or not the traveling mode of the vehicle 1 is the CD mode. In a case where the traveling mode is the CS mode (NO in S20), the processing proceeds to S50, and the ECU 300 allows the execution of the rotation speed increase control. In a case where the traveling mode is the CD mode (YES in S20), the processing proceeds to S30.

In S30, the ECU 300 determines whether or not the engine rotation speed Ne is positioned in the area R2 (refer to FIG. 2). In a case where the engine rotation speed Ne is not positioned in the area R2 (NO in S30), the processing proceeds to S50, and the ECU 300 allows the execution of the rotation speed increase control. In a case where the engine rotation speed Ne is positioned in the area R2, the processing proceeds to S40.

In S40, the ECU 300 limits the execution of the rotation speed increase control. In the first embodiment, the execution of the rotation speed increase control is prohibited as a form of the limitation on the execution of the rotation speed increase control.

The processing returns to the main routine in a case where the engine start request is absent (case where the engine 100 is in a stopped state, NO in S10) or when the processing of S40 or S50 is terminated.

According to the first embodiment described above, the execution of the rotation speed increase control is prohibited in the CD mode, and thus a reduction in the engine rotation speed Ne is prevented. Accordingly, a situation is unlikely to occur in which the engine output power Pe falls short of the vehicle power demand. Accordingly, the output power required for satisfying the vehicle power demand can be ensured.

In the CS mode, the execution of the rotation speed increase control is allowed. Accordingly, the driver is given the sense of acceleration corresponding to the increment in the vehicle speed V, and thus drivability can be improved.

Next, a second embodiment will be described. In the first embodiment, an example in which the rotation speed increase control is prohibited in the case of the CD mode has been described. In the second embodiment, a configuration will be described in which a decrement in the engine rotation speed Ne in the CD mode is less than a decrement in the engine rotation speed Ne in the CS mode although the execution of the rotation speed increase control is allowed even in the CD mode. The configuration of the vehicle according to the second embodiment is identical to the configuration of the vehicle 1 that is illustrated in FIG. 1, and thus detailed description thereof will not be repeated.

Figure 7:
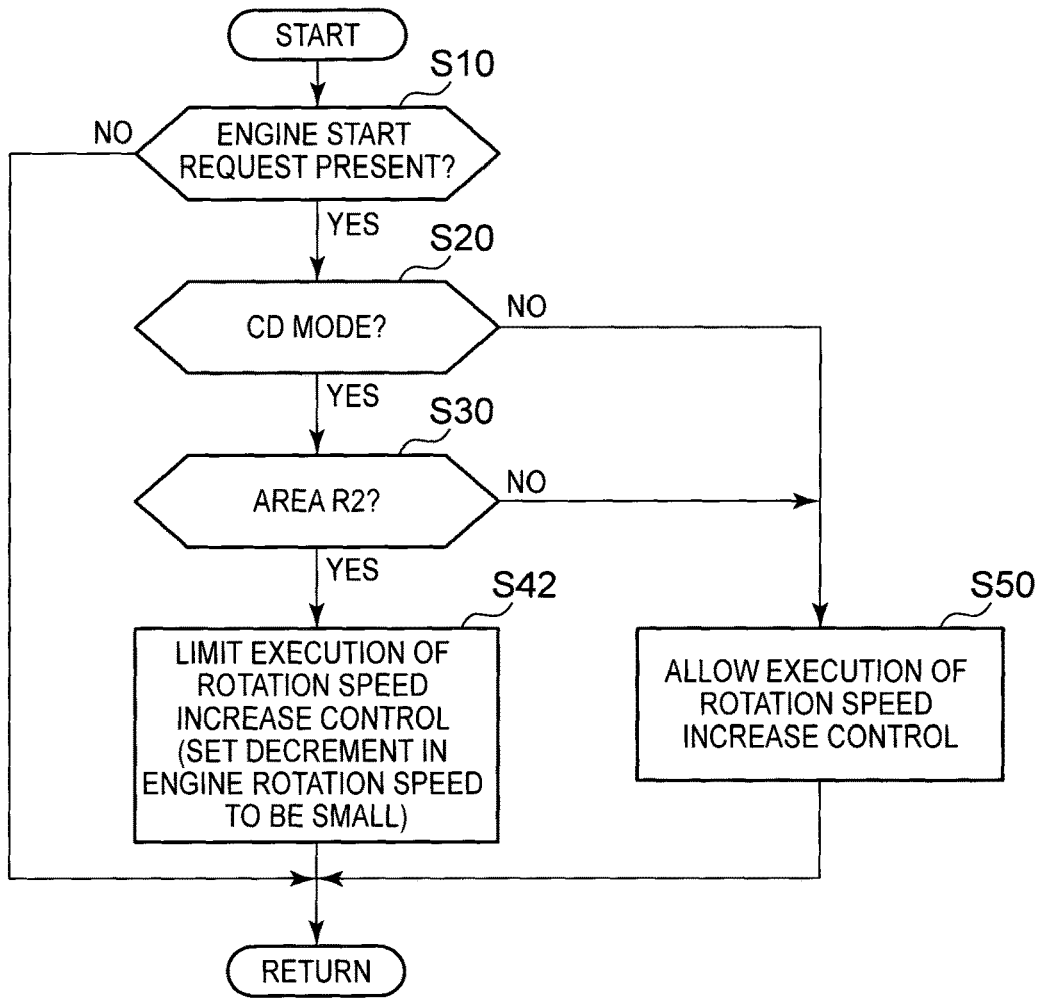
FIG. 7 is a flowchart for showing rotation speed increase control according to a second embodiment.

FIG. 7 is a flowchart for showing rotation speed increase control according to the second embodiment. Referring to FIG. 7, this flowchart is different from the flowchart that is illustrated in FIG. 6 in that the processing of S42 is executed instead of the prohibition of the rotation speed increase control (refer to S40 in FIG. 6). The processing other than S42 is identical to the corresponding processing in the flowchart that is illustrated in FIG. 6, and thus detailed description thereof will not be repeated.

In S42, the rotation speed increase control is executed even in the CD mode. Still, the decrement in the engine rotation speed Ne is set to be less than in the CS mode.

If the execution of the rotation speed increase control is prohibited in the CD mode as in the first embodiment, drivability relating to the sense of acceleration cannot be improved in the CD mode. However, if the discharging electric power does not reach the discharging electric power upper limit value Wout even in the CD mode, the supplementation of the shortfall of the engine output power Pe by using the discharging electric power may be possible. In other words, in the second embodiment, the rotation speed increase control is executed within a range in which the shortfall of the engine output power Pe with respect to the vehicle power demand can be supplemented by the motor output power Pm by using the discharging electric power from the battery 150.

In this manner, the output power required for satisfying the vehicle power demand can be ensured. In addition, since the rotation speed increase control is executed even in the CD mode, the driver can be given the sense of acceleration corresponding to the increment in the vehicle speed V. In other words, according to the second embodiment, the output power required for satisfying the vehicle power demand can be ensured and the drivability can be improved at the same time.

Next, a third embodiment will be described. As described in the second embodiment, the rotation speed increase control can be executed if the discharging electric power does not reach the discharging electric power upper limit value Wout. It is known that the discharging electric power upper limit value Wout has temperature dependence and SOC dependence, and discharging from the battery may be increasingly limited depending on the battery temperature or the SOC. In the third embodiment, a case will be described where whether or not to prohibit the execution of the rotation speed increase control is determined in accordance with the size of the discharging electric power upper limit value Wout. The configuration of the vehicle according to the third embodiment is identical to the configuration of the vehicle 1 that is illustrated in FIG. 1, and thus detailed description thereof will not be repeated.

Figure 8:
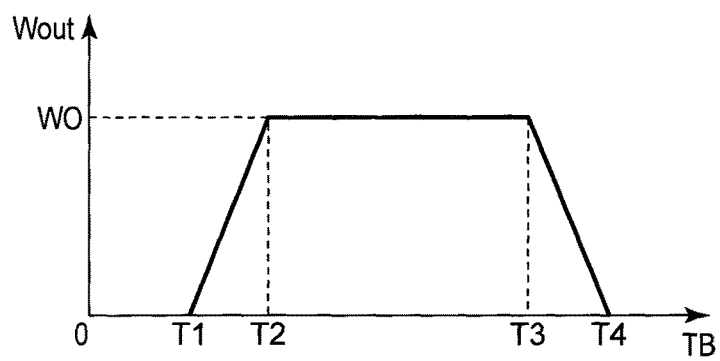
FIG. 8 is a diagram illustrating an example of the temperature dependence of a discharging electric power upper limit value of an electric power storage device.
Figure 9:
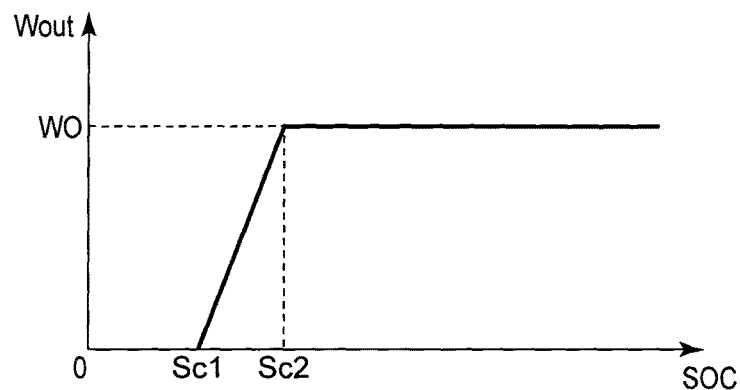
FIG. 9 is a diagram illustrating an example of the SOC dependence of the discharging electric power upper limit value of the electric power storage device.

FIG. 8 is a diagram illustrating an example of the temperature dependence of the discharging electric power upper limit value Wout. The horizontal axis in FIG. 8 represents the battery temperature TB and the vertical axis in FIG. 8 represents the discharging electric power upper limit value Wout. FIG. 9 is a diagram illustrating an example of the SOC dependence of the discharging electric power upper limit value. The horizontal axis in FIG. 9 represents the SOC of the battery 150 and the vertical axis in FIG. 9 represents the discharging electric power upper limit value Wout.

Referring to FIGS. 8 and 9, the discharging electric power upper limit value Wout is zero in a case where the battery temperature TB is equal to or less than T1 or equal to or greater than T4 in FIG. 8 (TB≤T1, T4≤TB) or in a case where the SOC is equal to or less than Sc1 in FIG. 9 (SOC≤Sc1). In other words, the discharging of the battery 150 is prohibited. Accordingly, even if the engine output power Pe falls short, the shortfall cannot be supplemented by the motor output power Pm.

In a case where the battery temperature TB exceeds T1 and is exceeded by T2 (T1<TB<T2) or in a case where the battery temperature TB exceeds T3 and is exceeded by T4 (T3<TB<T4), the discharging electric power upper limit value Wout is less than in a case where the battery temperature TB is equal to or higher than T2 and is equal to or less than T3 (T2≤TB≤T3). In addition, in a case where the SOC exceeds Sc1 and is exceeded by Sc2 (Sc1<SOC<Sc2), the discharging electric power upper limit value Wout is less than in a case where the SOC is at least Sc2 (SOC≥Sc2). As the discharging electric power upper limit value Wout decreases, the discharging from the battery 150 is increasingly limited, and thus it becomes more unlikely that the shortfall of the engine output power Pe can be supplemented by the motor output power Pm.

According to the third embodiment, the execution of the rotation speed increase control is prohibited, regardless of the traveling mode, in a case where the discharging from the battery 150 is increasingly limited in accordance with the battery temperature TB or the SOC and the discharging electric power upper limit value Wout is exceeded by a predetermined value. A maximum value WO is used as an example of the predetermined value. Still, the predetermined value is not limited thereto. The predetermined value can be appropriately determined in accordance with the configuration of the vehicle 1 (for example, the characteristic of the discharging electric power upper limit value Wout of the battery 150).

Figure 10:
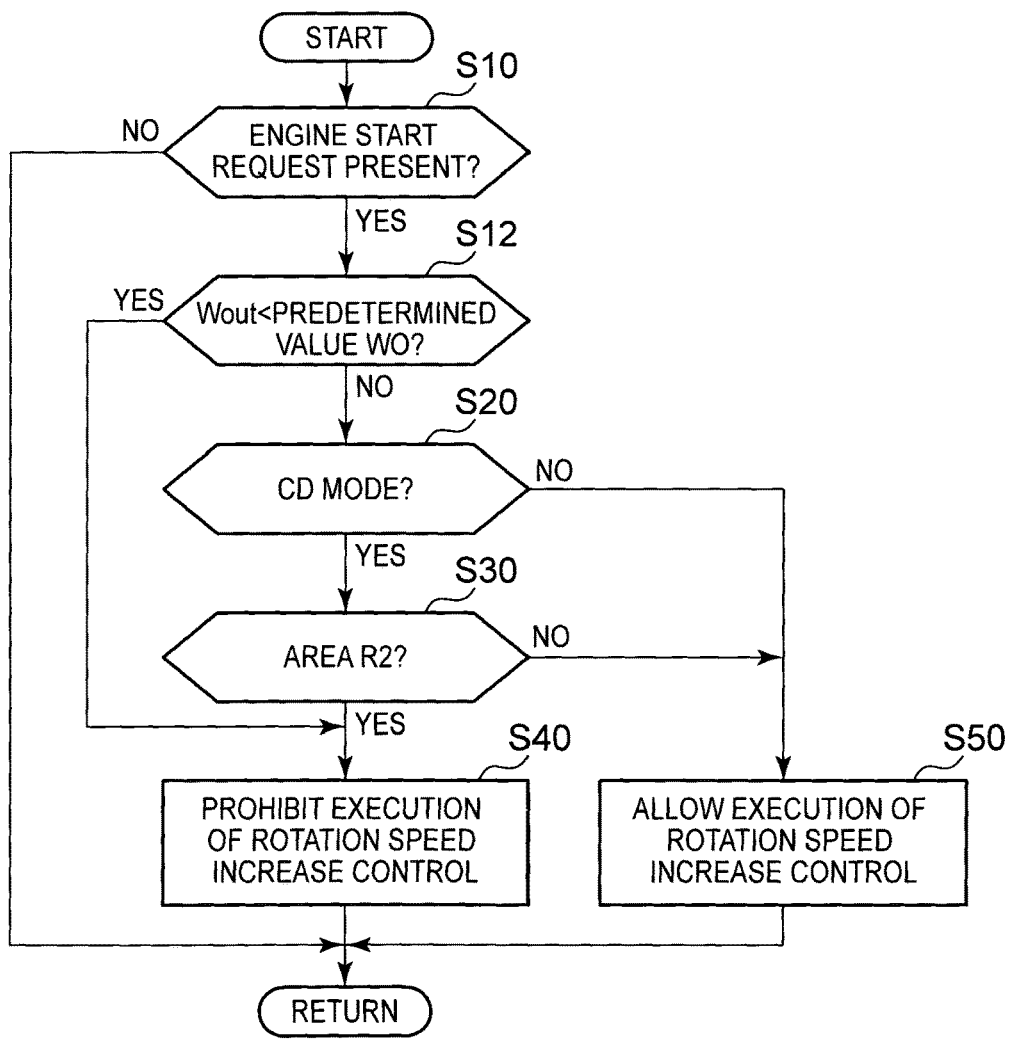
FIG. 10 is a flowchart for showing rotation speed increase control according to a third embodiment.

FIG. 10 is a flowchart for showing the rotation speed increase control according to the third embodiment. Referring to FIG. 10, this flowchart is different from the flowchart that is illustrated in FIG. 6 in that the processing of S12 is further provided. Description of the Steps common to FIG. 6 will not be repeated.

In S12, the ECU 300 determines whether or not the discharging electric power upper limit value Wout of the battery 150 is less than the maximum value WO. In the example that is illustrated in FIGS. 8 and 9, the ECU 300 determines that the discharging electric power upper limit value Wout is less than the maximum value WO in a case where the battery temperature TB is less than T2 (TB<T2) or in a case where the battery temperature TB exceeds T3 (TB>T3) in FIG. 8 or in a case where the SOC is less than Sc2 in FIG. 9 (SOC<Sc2).

In a case where the discharging electric power upper limit value Wout is less than the maximum value WO (YES in S12), the processing skips S20 and S30 and proceeds to S40, and the execution of the rotation speed increase control is prohibited regardless of the traveling mode.

In a case where the discharging electric power upper limit value Wout is equal to the maximum value WO (NO in S12), the processing proceeds to S20. The processing of S20 and the subsequent processing are identical to the corresponding processing illustrated in FIG. 6, and thus detailed description thereof will not be repeated. The execution of the rotation speed increase control is prohibited in the CD mode (S40) and the execution of the rotation speed increase control is allowed in the CS mode (S50). The procedure of the processing is not limited to the example that is illustrated in FIG. 10. The processing of S12 may be executed after the processing of S20.

According to the third embodiment described above, the execution of the rotation speed increase control is prohibited, in view of the temperature dependence and the SOC dependence of the discharging electric power upper limit value Wout of the battery 150, in a case where the discharging electric power upper limit value Wout is exceeded by a predetermined value (maximum value WO in the example described above) and a situation occurs in which the shortfall of the engine output power Pe cannot be supplemented by the motor output power Pm. In this manner, the probability of being capable of ensuring the output power required for satisfying the vehicle power demand can be further increased.

Next, a fourth embodiment will be described. In a case where, for example, a warm-up request for the engine, a heating request for the air-conditioner, or the like is present, the engine can be started even if the vehicle power demand does not reach the start threshold. In this case, the discharging electric power from the battery does not have a value close to the discharging electric power upper limit value, and thus the shortfall of the engine output power can be supplemented even in the CD mode. In the fourth embodiment, control for a case where the engine is started in accordance with an engine start request not associated with the vehicle power demand as described above will be described. The configuration of the vehicle according to the fourth embodiment is identical to the configuration of the vehicle 1 that is illustrated in FIG. 1, and thus detailed description thereof will not be repeated.

Figure 11:
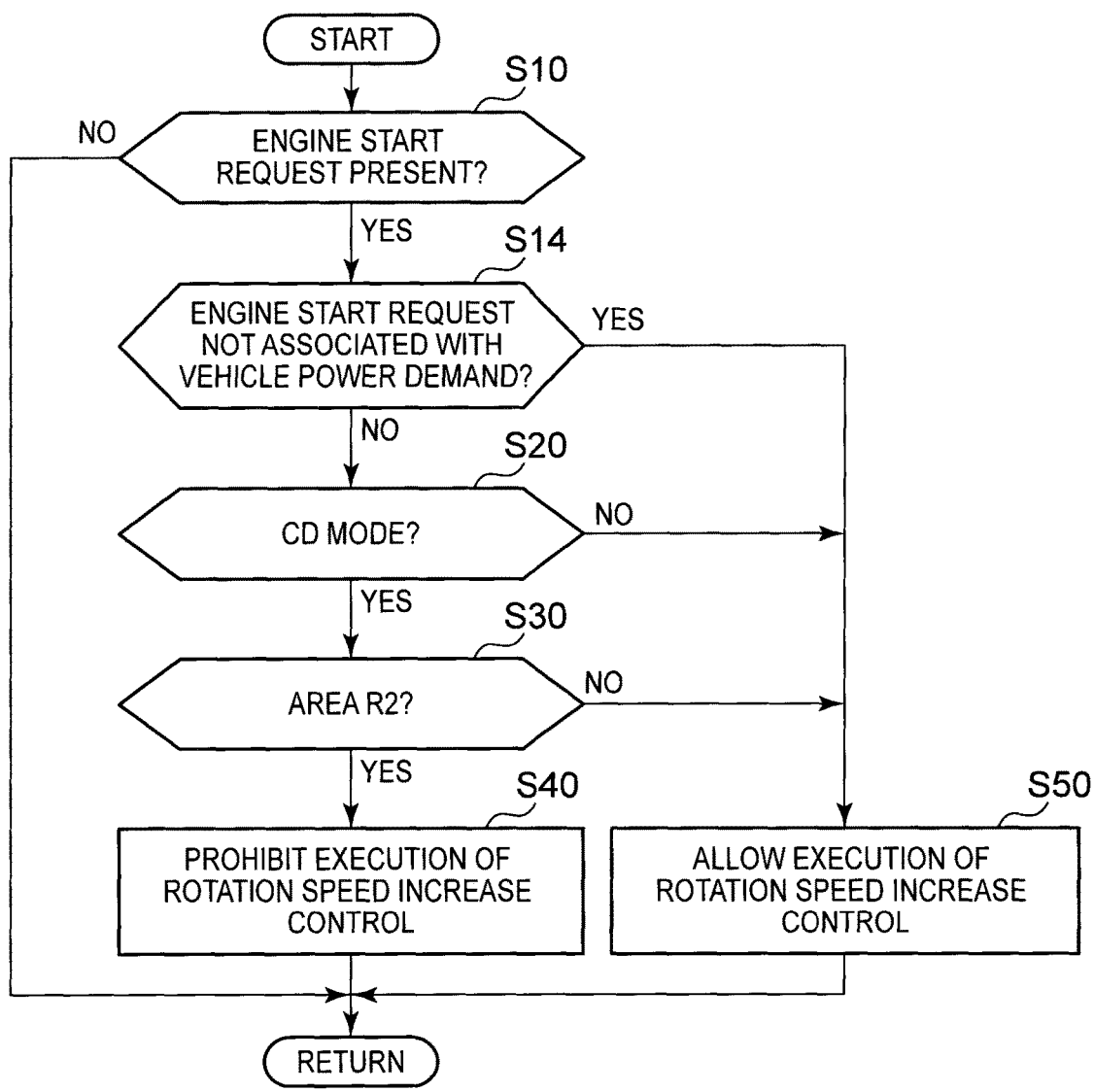
FIG. 11 is a flowchart for showing rotation speed increase control according to a fourth embodiment.

FIG. 11 is a flowchart for showing rotation speed increase control according to the fourth embodiment. Referring to FIG. 11, this flowchart is different from the flowchart that is illustrated in FIG. 6 in that the processing of S14 is further provided.

In S14, the ECU 300 determines whether or not the engine start request in S10 is not associated with the vehicle power demand.

In a case where the engine 100 is started in response to the engine start request not associated with the vehicle power demand (YES in S14), that is, in a case where the engine 100 is started by the warm-up request for the engine 100 or the heating request for the air-conditioner 130, the stopping of the engine 100 (including intermittent stopping) is prohibited regardless of the vehicle power demand and the engine 100 is maintained in the driving state.

This case does not mean that the engine 100 is started with the vehicle power demand reaching the start threshold, and thus the discharging electric power from the battery does not have a value close to the discharging electric power upper limit value Wout and the discharging electric power can be increased. Accordingly, in a case where the rotation speed increase control is executed, the shortfall of the engine output power Pe can be supplemented by the motor output power Pm. Accordingly, the processing proceeds to S50 and the execution of the rotation speed increase control is allowed. In other words, in the fourth embodiment, the limitation on the execution of the rotation speed increase control is relaxed compared to the flowchart that is illustrated in FIG. 6.

In a case where the engine 100 is started with the vehicle power demand reaching the start threshold (NO in S14), the processing proceeds to S20. The processing of S20 and the subsequent processing are identical to the corresponding processing illustrated in FIG. 6, and thus detailed description thereof will not be repeated.

An example in which the engine 100 is started by the warm-up request for the engine 100 or the heating request for the air-conditioner 130 has been described. However, other engine start requests not associated with the vehicle power demand are also present in addition thereto.

One of the examples thereof is a case where the engine 100 is started so as to prevent overspeed of the pinion (not illustrated) in the power split mechanism 30. In some cases, the rotation speed of the pinion may excessively increase depending on the rotation speeds of the first motor generator 10 and the second motor generator 20. An upper limit value is defined for the rotation speed of the pinion in order to prevent the seizure of the pinion in this case. The engine 100 is started if the rotation speed of the pinion approaches the upper limit value.

Another one of the examples thereof is a case where the battery 150 cannot be charged with the electric power regenerated by the second motor generator 20 in a case where the battery 150 is in a fully-charged state. In this case, the first motor generator 10 may be driven by using the electric power regenerated by the second motor generator 20 and the engine 100 may be started by the first motor generator 10 so as to prevent overcharging of the battery 150.

The control that has been described in the first to fourth embodiments can be appropriately combined. For example, the processing for limiting the execution of the rotation speed increase control (S42 in FIG. 7) may be executed instead of the processing for prohibiting the execution of the rotation speed increase control (S40) in the flowchart for the third embodiment that is illustrated in FIG. 10. Alternatively, the processing for determining whether or not the discharging electric power upper limit value Wout of the battery 150 is less than the maximum value WO (S12 in FIG. 10) may be added to the flowchart for the fourth embodiment that is illustrated in FIG. 11.

Lastly, this embodiment will be summarized referring back to FIG. 1. The vehicle 1 is provided with the engine 100, the battery 150, the second motor generator 20 that generates the driving force by using the electric power of the battery 150, and the ECU 300 that controls the engine 100 and the second motor generator 20. The ECU 300 is configured to be capable of executing the rotation speed increase control for controlling the engine rotation speed Ne so that the engine sound pressure is increased in response to an increase in the vehicle speed V of the vehicle 1. In the CD mode in which the SOC of the battery 150 is consumed, the ECU 300 limits the execution of the rotation speed increase control compared to the CS mode in which the SOC is maintained in a predetermined range.

The ECU 300 may allow the execution of the rotation speed increase control in the CS mode and prohibit the execution of the rotation speed increase control in the CD mode.

In addition, the prohibition of the execution of the rotation speed increase control by the ECU 300 in the CD mode may be limited to a range in which the internal combustion engine and the sound pressure have a specific relationship.

In addition, in a case where the upper limit value of the discharging electric power of the electric power storage device is exceeded by a predetermined value, the ECU 300 may prohibit the rotation speed increase control regardless of the CS mode or the CD mode.

In addition, in a case where the rotation speed increase control is executed, the ECU 300 may reduce the engine rotation speed Ne compared to a case where the rotation speed increase control is not executed so that the ratio of the engine output power Pe to the vehicle power demand is reduced and the ratio of the motor output power Pm to the vehicle power demand is increased. In the CD mode, the ECU 300 may set the decrement in the engine rotation speed Ne to be small compared to the CS mode, as a limitation on the execution of the rotation speed increase control, so as to suppress a reduction in the ratio of the engine output power Pe.

In addition, when the engine 100 is started in response to the engine start request not associated with the vehicle power demand, the ECU 300 may relax the limitation on the execution of the rotation speed increase control even in the CD mode.

In addition, the vehicle 1 may also be provided with the air-conditioner 130 that performs air conditioning in the passenger compartment. The engine start request may include at least one of the warm-up request for the engine 100 and the heating request for the air-conditioner 130.

In a control method for the vehicle 1, the vehicle 1 includes the engine 100, the battery 150, and the second motor generator 20 that generates the driving force by using the electric power of the battery 150. The vehicle 1 is configured to be capable of executing the rotation speed increase control for controlling the engine rotation speed Ne so that the engine sound pressure is increased in response to an increase in the vehicle speed V of the vehicle 1. The control method is provided with the Step (S50) for executing the rotation speed increase control and the step (S40) for limiting the execution of the rotation speed increase control in the CD mode in which the SOC of the battery 150 is consumed compared to the CS mode in which the SOC is maintained in a predetermined range.

It should be noted that the embodiments disclosed herein are exemplary in every aspect and do not limit the invention. The scope of the invention is clarified by the claims, not the description above, and the invention includes any change within the meaning and range equivalent to the claims.

The invention claimed is:

1. A hybrid vehicle comprising:
an internal combustion engine;
an electric power storage device;
a rotary electric machine configured to generate a driving force by using electric power of the electric power storage device; and
an electronic control unit configured to
(i) control the internal combustion engine and the rotary electric machine,
(ii) execute rotation speed increase control for controlling a rotation speed of the internal combustion engine so as to increase a sound pressure of the internal combustion engine in response to an increase in a vehicle speed of the hybrid vehicle, and
(iii) limit the execution of the rotation speed increase control in a case where the rotation speed of the internal combustion engine is positioned in a predetermined area during a charge depleting mode compared to a case where the internal combustion engine is in a driving state during a charge sustaining mode, the predetermined area being an area in which an increment in the engine sound pressure increases more than another area with respect to an increment in the vehicle speed, in the charge depleting mode a state of charge of the electric power storage device being consumed, and in the charge sustaining mode the state of charge of the electric power storage device being maintained in a predetermined range.

2. The hybrid vehicle according to claim 1,
wherein the electronic control unit is configured to
(i) allow the execution of the rotation speed increase control in the charge sustaining mode, and
(ii) prohibit the execution of the rotation speed increase control in the charge depleting mode.

3. The hybrid vehicle according to claim 2,
wherein the electronic control unit is configured to limit the prohibition of the execution of the rotation speed increase control in the charge depleting mode to a range in which the internal combustion engine and the sound pressure have a specific relationship.

4. The hybrid vehicle according to claim 1,
wherein the electronic control unit is configured to prohibit the rotation speed increase control regardless of the charge sustaining mode or the charge depleting mode in a case where an upper limit value of discharging electric power of the electric power storage device is less than a predetermined value.

5. The hybrid vehicle according to claim 1,
wherein the electronic control unit is configured to
(i) reduce the ratio of power output from the internal combustion engine to a power demand for the hybrid vehicle and increase the ratio of power output from the rotary electric machine to the power demand, by reducing the rotation speed in a case where the rotation speed increase control is executed compared to a case where the rotation speed increase control is not executed, and
(ii) suppress a reduction in the ratio of the power output from the internal combustion engine, by setting a decrement in the rotation speed to be small in the charge depleting mode compared to the charge sustaining mode, as a limitation on the execution of the rotation speed increase control.

6. The hybrid vehicle according to claim 1,
wherein the electronic control unit is configured to relax the limitation on the execution of the rotation speed increase control even in the charge depleting mode, when the internal combustion engine is started in response to a start request for the internal combustion engine, the start request being not associated with the power demand for the hybrid vehicle.

7. The hybrid vehicle according to claim 6, further comprising:
an air-conditioner configured to perform air conditioning in a passenger compartment of the hybrid vehicle,
wherein the start request includes at least one of a warm-up request for the internal combustion engine or a heating request for the air-conditioner.

8. A control method for a hybrid vehicle, the hybrid vehicle including an internal combustion engine, an electric power storage device, a rotary electric machine generating a driving force by using electric power of the electric power storage device, and an electronic control unit, the control method comprising:
executing, by the electronic control unit, rotation speed increase control for controlling a rotation speed of the internal combustion engine so as to increase a sound pressure of the internal combustion engine in response to an increase in a vehicle speed of the hybrid vehicle; and
limiting, by the electronic control unit, the execution of the rotation speed increase control in a case where the rotation speed of the internal combustion engine is positioned in a predetermined area during a charge depleting mode compared to a case where the internal combustion engine is in a driving state during a charge sustaining mode, the predetermined area being an area in which an increment in the engine sound pressure increases more than another area with respect to an increment in the vehicle speed, in the charge depleting mode a state of charge of the electric power storage device being consumed, and in the charge sustaining mode the state of charge of the electric power storage device being maintained in a predetermined range.

* * * * *